US006965328B2

United States Patent
Ji

(10) Patent No.: US 6,965,328 B2
(45) Date of Patent: Nov. 15, 2005

(54) APPARATUS AND METHOD FOR SUPPORTING PLURAL CODECS

(75) Inventor: Salk Mann Ji, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/754,053

(22) Filed: Jan. 7, 2004

(65) Prior Publication Data

US 2004/0140916 A1 Jul. 22, 2004

(30) Foreign Application Priority Data

Jan. 8, 2003 (KR) .............................. 10-2003-0001071

(51) Int. Cl.[7] .............................................. H03M 7/00
(52) U.S. Cl. ...................... 341/50; 341/67; 375/240.02; 375/240.27; 382/233; 382/234; 382/243; 382/246
(58) Field of Search ................ 341/50, 67; 375/240.02, 375/240.12; 382/233–234, 243, 246

(56) References Cited

U.S. PATENT DOCUMENTS

| 5,539,466 A | * | 7/1996 | Igarashi et al. | ........ 375/240.15 |
| 5,706,053 A | * | 1/1998 | Urano | ................... 375/240.15 |
| 5,715,009 A | * | 2/1998 | Tahara et al. | .......... 375/240.23 |
| 5,736,944 A | * | 4/1998 | Kurihara | ...................... 341/50 |
| 5,945,931 A | * | 8/1999 | Tahara et al. | ................. 341/50 |
| 6,466,697 B1 | * | 10/2002 | Boon | ......................... 382/233 |
| 6,507,611 B1 | * | 1/2003 | Imai et al. | ................... 375/222 |
| 6,665,445 B1 | * | 12/2003 | Boon | ......................... 382/243 |
| 6,735,344 B2 | * | 5/2004 | Boon | ......................... 382/243 |
| 6,862,320 B1 | * | 3/2005 | Isu et al. | ............... 375/240.27 |

FOREIGN PATENT DOCUMENTS

| CN | 1140003 | 1/1997 |
| CN | 1184313 | 6/1998 |
| WO | WO 00/16513 | 9/1999 |

* cited by examiner

*Primary Examiner*—Michael Tokar
*Assistant Examiner*—Khai Nguyen
(74) *Attorney, Agent, or Firm*—Lee, Hong, Degerman, Kang & Schmadeka

(57) ABSTRACT

Different video codecs can be integrated or duplicated functions of each codec can be shared. According to an apparatus and method for supporting plural codecs of the present invention, a decoding process can be performed by analyzing information of a transmitted bit stream, deciding kind of codec being used by means of a header analysis unit, connecting through a switching unit to a corresponding decoder of a decoding unit including plural decoders or to a corresponding operation block among a plurality of operation blocks including at least one function.

9 Claims, 4 Drawing Sheets

APPARATUS AND METHOD FOR SUPPORTING PLURAL CODECS

BACKGROUND OF THE INVENTION

1. Field of the Invention

The present invention relates to an apparatus and method for supporting plural video codecs.

2. Discussion of the Background Art

Communication environment at present and in future is and will be rapidly changing enough to break distinction between wired coverage and wireless coverage, or boundaries of nations. Especially, the third generation communication environment classified by IMT-2000 shows a current tendency in mobile communications, providing users with not only image and voice but also diverse information comprehensively or in real time mode.

Development in personal communication system also made it possible for cellular phones or PCS possible to extend services from a simple voice communication to transmission of mobile text messages, wireless Internet access, and transmission of moving pictures that are usually seen in TVs through a personal communication terminal.

Such technique is being an essential element in a digital television system, which processes moving images to digital data, transmits/receives the digital data in real time mode and displays on a screen, and in a personal communication terminal adopting IMT-2000, which transmits moving images in real time mode.

Traditionally, a portable terminal was devised to transmit/receive human voices only. However, thanks to the development of multimedia and digital data processing techniques, it is now possible to transmit various information including voice and image.

Most of all, commercial use of the above technique largely contributes to a compression technique for moving pictures which applies special digital processing to analog image signals, e.g., quantization and variable length coding, transmits the digitized signals over a transmit digital channel, and decodes the image signals at a receiving terminal, thereby transmitting more information at a higher transmission speed.

Therefore, unlike in the past, a moving image communication terminal provides a higher-level service to users by enabling the users to listen and see real-time moving images and voices.

FIG. 1 is a schematic block diagram illustrating a configuration of a related art video decoder.

Referring to FIG. 1, the video decoder includes a VLD (variable length decoder) 100, an IQ (inverse quantization) unit 110, an IDCT (inverse discrete cosine transformation) unit 120, a MC (motion compensation) unit 140, and a mixing unit 130.

The VLD (variable length decoder) 100 decodes transmitted compressed bit stream to reconstruct an image therefrom, and transmits decoded signals to the IQ unit 100.

Then the IQ unit 110 performs a quantization process to the transmitted signal from the VLD 100, in an inverse way from a compression method in an encoder for reconstruction of the image.

The IDCT unit 120 performs an inverse discrete cosine transformation process on the transmitted signal from the IQ unit 110.

The mixing unit 130 determines whether an image frame of the transmitted signal from the IDCT unit 120 is an intra mode image that starts first or an inter mode image with a previous image frame. If the image frame of the transmitted signal turns out to be the intra mode image, the mixing unit 130 outputs the image right away since there is no motion vector therein.

The MC unit 140 obtains a difference between a motion vector of an image frame currently being decoded and of a previous image frame, and compensates the decoded image.

An operation of the video decoder having the above video codec will be now explained below.

An analog image signal undergoes discrete cosine transformation and quantization in an encoder, and an image frame signal whose variable length is coded is transmitted to the decoder in a compressed bit stream.

The decoder transmits the transmitted bit stream to the VLD 100, and the VLD 100 transforms value and length of the transmitted bit stream to a two dimensional code.

Then the VLD 100 transmits the two-dimensional code signal to the IQ unit 110.

The IQ unit 110 performs the inverse scan and inverse quantization to the transmitted signal from the VLD 100, and transmits the signal to the IDCT unit 120.

The IDCT unit 120 performs the inverse discrete cosine transformation to the transmitted signal from the IQ unit 110. Then the image signal is inputted to the mixing unit 130. The mixing unit 130 determines whether this image frame to be reconstructed is an intra mode image that starts first or an inter mode image having a previous image frame, and if the image frame is of the intra mode image, outputs the image right away since there is no motion vector therein. Finally, the MC unit 140 obtains a difference between the motion vector of the image frame to be decoded and of the previous image frame, and compensates the decoded image.

To compare various types of video codecs, some codecs have the same operation block function and the same embodiment for each codec, but some codecs have the same function yet a different embodiment for each codec. For example, IDCT unit 120 performs the inverse conversion, and its embodiment is equal in MPEG4 and H.263 video codecs. However, although IQ unit 110 performs the inverse quantization, its embodiment is different in MPEG4 and H.263 video codecs.

Therefore, a problem arises that imaging equipment should have several built-in video codecs to support various kinds of video, which only increases size and cost of the imaging equipment.

SUMMARY OF THE INVENTION

An object of the invention is to solve at least the above problems and/or disadvantages and to provide at least the advantages described hereinafter.

Accordingly, one object of the present invention is to solve the foregoing problems by providing an apparatus, namely a video decoder) and method for supporting plural video codecs, in which the video decoder supports a plurality of video codecs, in which diverse video codecs can be integrated or one decoder can have plural function blocks, and the number of functions of the function block can be integrated according to compatibility among different codecs, thereby sharing common functions.

The foregoing object is realized by providing an apparatus for supporting plural codecs, including: a header analysis unit for analyzing input information of a transmitted bit stream and deciding kind of codec being used; a switching unit connected to the header analysis unit, wherein, on the basis of the input information, the switching unit is connected to a corresponding decoder including a plurality of decoders or to a corresponding operation block out of plural operation blocks including at least one function; and a decoding unit for decoding the bit stream by means of the switched decoder or the operation block.

In an exemplary embodiment of the invention, the header analysis unit analyzes a header of the transmitted compressed bit stream, decides kind of codec, and generates a switch connection command confirming to the decided codec.

In an exemplary embodiment of the invention, the switching unit is connected to the corresponding decoder or each of the operation blocks.

In an exemplary embodiment of the invention, the switching unit connects the corresponding decoder to each of the operation block, in response to the switch connection command.

In an exemplary embodiment of the invention, the number of switches to be connected to each of the operation blocks is equal or less than the number of operation blocks.

In an exemplary embodiment of the invention, the number of switches to be connected to each of the operation blocks is equal or less than the number of operation blocks.

In an exemplary embodiment of the invention, the decoding unit is characterized of that each of the operation blocks operated in respective codecs exists in one board.

In an exemplary embodiment of the invention, the decoding unit is characterized of that each of the operation blocks corresponding to each codec exists independently in one board.

In an exemplary embodiment of the invention, the number of functions in the operation blocks connected to at least one switching unit is equal or less than the number of the codecs.

In an exemplary embodiment of the invention, the functions of the operation blocks connected to at least one switching unit can be integrated in accordance with kind of the codec.

Another aspect of the invention provides a method for supporting plural codecs, including the steps of: analyzing a header of a transmitted compressed bit stream and deciding kin of codec; and in confirmation to the decided codec, connecting a switch to a decoding unit including a plurality of decoders or to an each operation block with own function, and decoding the bit stream.

Another aspect of the invention provides a method for supporting plural codecs, including the steps of: designating at least one predetermined function capable of supporting an operation block (function block) in accordance with kind of codec; in a header analysis unit, analyzing input information and deciding kind of codec and functions thereof; switching to a corresponding function in a function block capable of supporting the decided codec and functions; and decoding the input information.

According to the apparatus (i.e. the video decoder) and method for supporting plural video codecs of the present invention, by pre-analyzing kind of codec used in the input bit stream, it is possible to decode bit streams of every kind of codec that can be supported by one single decoder, without loading the decoder.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present an apparatus and method for supporting plural codecs according to a preferred embodiment of the invention in reference to the accompanying drawings.

Figure 2:
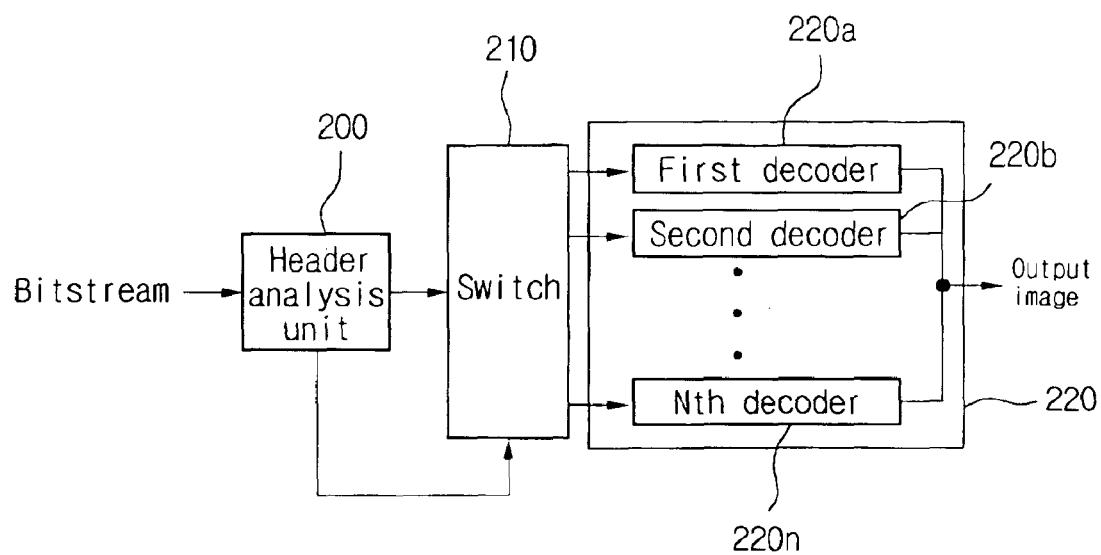
FIG. 2 is a schematic block diagram illustrating a configuration of a video decoder for supporting plural codecs in accordance with a preferred embodiment of the present invention.

FIG. 2 is a schematic block diagram illustrating a configuration of a video decoder for supporting plural codecs in accordance with a preferred embodiment of the present invention.

Referring to FIG. 2, the video decoder for supporting plural codecs includes a header analysis unit 200, a switch 210, and a decoding unit (220a, 220b, 220n, hereinafter referred to as 220).

The header analysis unit 200 analyzes a header of a transmitted compressed bit stream, and determines which decoder should be used. Therefore, the header analysis unit 200 transmits to the switch 210 a switch connection command corresponding to kind of the decoder being determined.

In response to the transmitted switch connection command from the header analysis unit 200, the switch 210 connects the corresponding decoder 220 to the switch.

The decoder unit 220 includes a first decoder 220a for supporting H.262 (Codec A decoder for H263), a second decoder 220b for supporting H.26L, and an n-th decoder 220n for supporting MPEG4.

Figure 1:
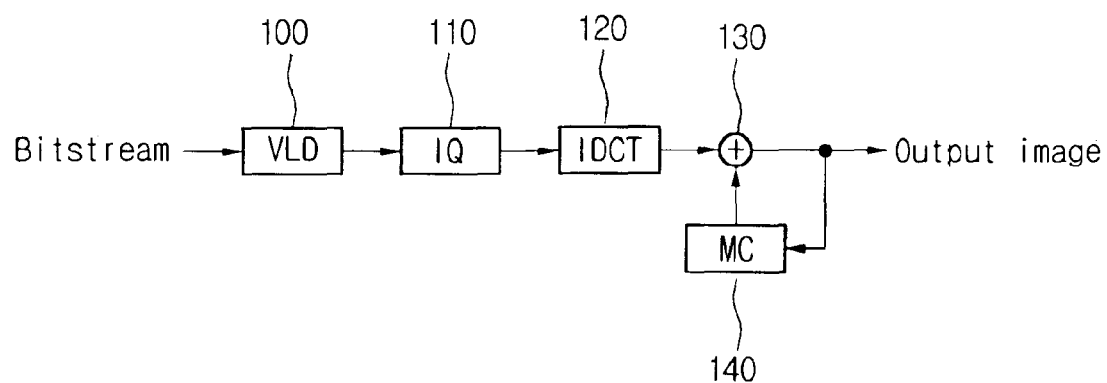
FIG. 1 is a schematic block diagram illustrating a configuration of a related art video decoder.

Since each of the decoders has the same configuration with the one illustrated in FIG. 1, further details thereon will not be provided here.

An operation of the video decoder for supporting plural codecs with the above configuration will be now described.

When a compressed bit stream is transmitted, the header analysis unit 200 analyzes the header of the transmitted bit stream, and decides which decoder should be used.

That is to say, the header analysis unit 200 selects one of H.262, H.26L, and MPEG4, on the basis of the header information of the transmitted bit stream.

To use the decoder of the corresponding codec to the decision result, the header analysis unit 200 transmits the switch connection command to the switch, following the decision result.

Then the switch 210, in response to the switch connection command, connects the corresponding decoder 220. Thus, the transmitted bit stream to the decoder 220 is transmitted to a VLD (variable length decoder), and the VLD transforms value and length of the transmitted bit stream to a two-dimensional code.

Afterwards, the VLD transmits the two-dimensional coded signal to an IQ (inverse quantization) unit. The IQ unit performs the inverse scan to the transmitted signal from the VLD, and transmits the inversely scanned signal to an IDCT (inverse discrete cosine transformation) unit.

The IDCT unit performs the inverse discrete cosine transformation to the transmitted signal from the IQ unit. In the IDCT unit, the inverse discrete cosine transformed image is compensated through a motion vector transmitted from a MC (motion compensation) unit, and outputted later.

Figure 3:
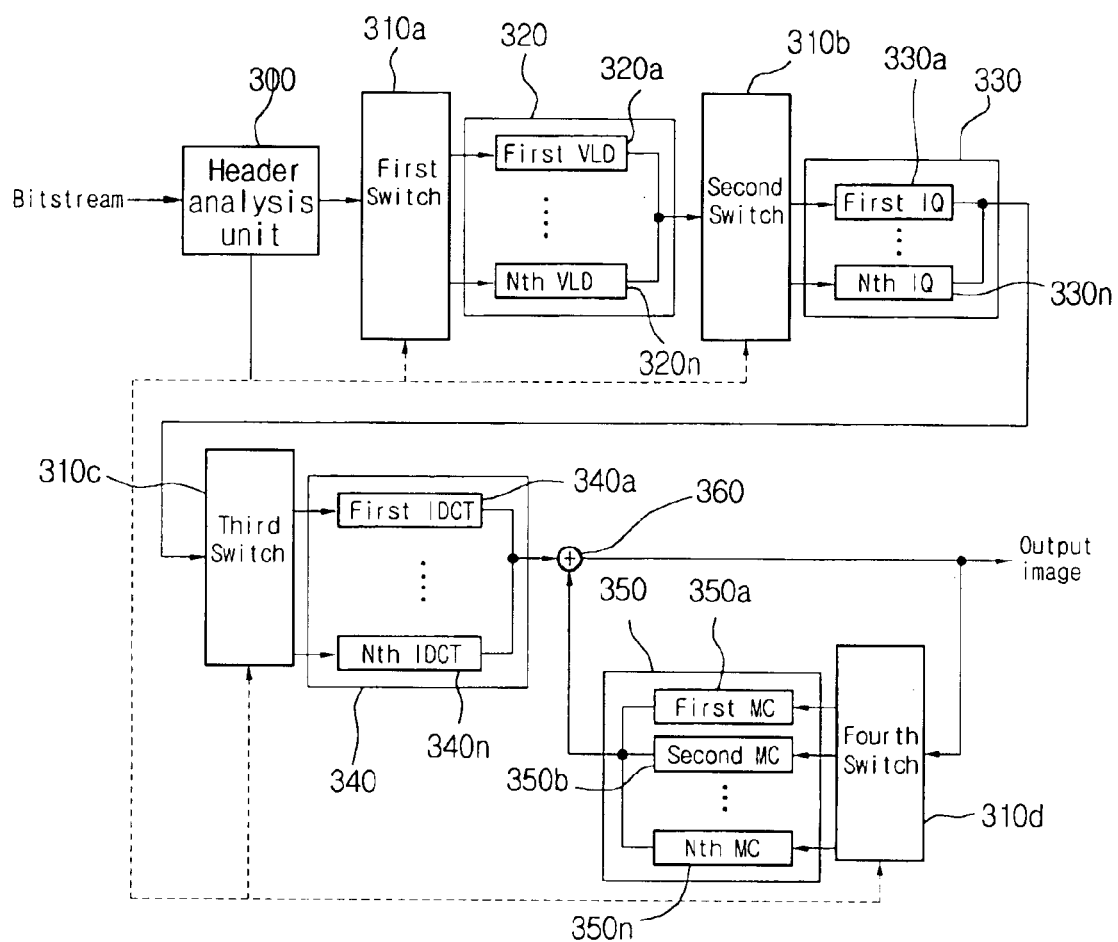
FIG. 3 is a schematic block diagram illustrating a configuration of a video decoder for supporting plural codecs in accordance with another preferred embodiment of the present invention.

To compare the above-discussed FIG. 2 with FIG. 3 to be explained later on, FIG. 2 is characterized of integration of each decoder, and FIG. 3 is characterized of sharing sharable function(s) like compatible functions.

More specifically speaking, FIG. 2 suggests integration and switching of already applied various kinds of decoders. Even though it is easy to embody the decoders, when embodied in S/W, their duplicate functions increase code size. When embodied in H/W, on the other hand, the hardware area is increased.

Meanwhile, in FIG. 3, the duplicate functions are taken out so that they are to be performed only once. Although the complexity of the decoder seems to be greater, the code size and the hardware area problems in FIG. 2 are compensated.

FIG. 3 is a schematic block diagram illustrating a configuration of a video decoder for supporting plural codecs in accordance with another preferred embodiment of the present invention.

Referring to FIG. 3, the video decoder for supporting plural codecs includes a header analysis unit 300, a switch unit 310a, 310b, 310c, and 310d (hereinafter they are referred to as 310), a VLD unit 320a, . . . , 320n (hereinafter they are referred to as 320), an IQ unit 330a, . . . , 330n (hereinafter they are referred to as 330), an IDCT unit 340a, . . . , 340n (hereinafter they are referred to as 340), a MC unit 350a, 350b, . . . , 350n (hereinafter they are referred to as 350), and a mixing unit 360.

The header analysis unit 300 analyzes a header of a transmitted compressed bit stream, and decides kind of codec. Then, corresponding to the kind of codec being decided, the header analysis unit 300 transmits a switch connection command to the switch unit 310.

In response to the transmitted switch connection command from the header analysis unit 300, the switch unit 310 connects the switch to a corresponding to operation block. Here, the operation block includes the VLD 320, the IQ unit 330, the IDCT unit 340, and the MC unit 350.

The switch unit 310 includes a first switch 310a, a second switch 310b, a third switch 310c, and a fourth switch 310d.

The first switch 310a is connected to the VLD 320 corresponding to the switch connection command, and the second switch 310b is connected to the IQ unit 330 corresponding to the switch connection command. The third switch 310c is connected to the IDCT 340 corresponding to the switch connection command, and the fourth switch 310d is connected to the MC unit 350 corresponding to the switch connection command.

For instance, when the switch connection command is a H.263 operation block connection command, the first switch 310a is connected to a H.263 VLD, the second switch 310b to a H.263 IQ unit, the third switch 310c to a H.263 IDCT unit, and the fourth switch 310d to a H.263 MC unit.

Among other VLD functions of various codecs, the VLD 320 shows different VLDs, e.g., a first VLD 320a, an n-th VLD 320n. For example, a H.263 VLD and an MPEG4 VLD are different from each other, and thus, they are embodied respectively.

The VLD 320 decodes the transmitted compressed bit stream for reconstruction of an image therefrom, and transmits the decoded signal to the IQ unit 330.

Among other inverse quantization functions of various codecs, the IQ unit 330 shows different IQs, e.g., a first IQ unit 330a, and an n-th IQ unit 330n. For example, a H.263 IQ unit 330 and an MPEG4 IQ unit 330 are different from each other, and thus, they are embodied respectively.

The IQ unit 330 performs the quantization to the transmitted signal from the VLD 320, in an inverse way from a compression method in an encoder for reconstruction of the image.

Among other inverse discrete cosine transformation functions of various codecs, the IDCT unit 340 shows different IDCTs, e.g., a first IDCT unit 340a, and an n-th IDCT unit 340n. For example, a H.263 IDCT unit 340 and an MPEG4 IDCT unit 340 are same with each other so that they can be embodied respectively, or only one of them can be embodied.

The IDCT unit 340 performs the inverse discrete cosine transformation to the transmitted signal from the IQ unit 330.

Among other motion compensation functions of various codecs, the MOC unit 350 shows different MC units 350, e.g., a first MC unit 350a, a second MC unit 350b, and an n-th MC unit 350n.

For example, a H.263 MC unit 350 and an MPEG4 MC unit 350 are almost same with each other so that they can be combined or embodied respectively.

The MC unit 350 compensates the motion vector 350 in the transmitted image from the IDCT unit 340.

In the Mixing unit 360, the MC unit 350 compensates the transmitted signal from the IDCT 340, and the compensated image is outputted.

An operation of the video decoder for supporting plural codecs with the above configuration will be now discussed below.

When a compressed bit stream is transmitted, the header analysis unit 300 analyzes the header of the transmitted bit stream, and decides which kind of codec to be used. That is, the header analysis unit 300 decides to which codec out of H.262, H.26L, and MPEG4 the header of the transmitted bit stream is compressed.

Confirming the decision result, the header analysis unit 300 transmits a switch connection command to each switch 310. For instance, if it turns out that the transmitted bit stream is compressed in H.263, the header analysis unit 300 transmits a H.263 switch connection command to each switch 310.

Then the first switch 310a connects the H.263 VLD, the second switch 310b connects the H.263 IQ unit, the third switch 310c connects the IDCT unit, and the fourth switch 310d connects the H.263 MC unit, each switch following the H.263 switch connection command.

The VLD 320 transforms value and length of the transmitted bit stream to a two-dimensional code. After that, the VLD 320 transmits the transformed two-dimensional coded signal to the IQ unit 330.

In the IQ unit 330, the transmitted signal from the VLD 320 is inversely scanned, and transmitted to the IDCT 340.

The IDCT unit 340 performs the inverse discrete cosine transformation to the transmitted signal from the IQ unit 330. Compensate to the transformed image is a motion vector transmitted from the MC unit 350, and the compensated image is outputted at the end.

Figure 4:
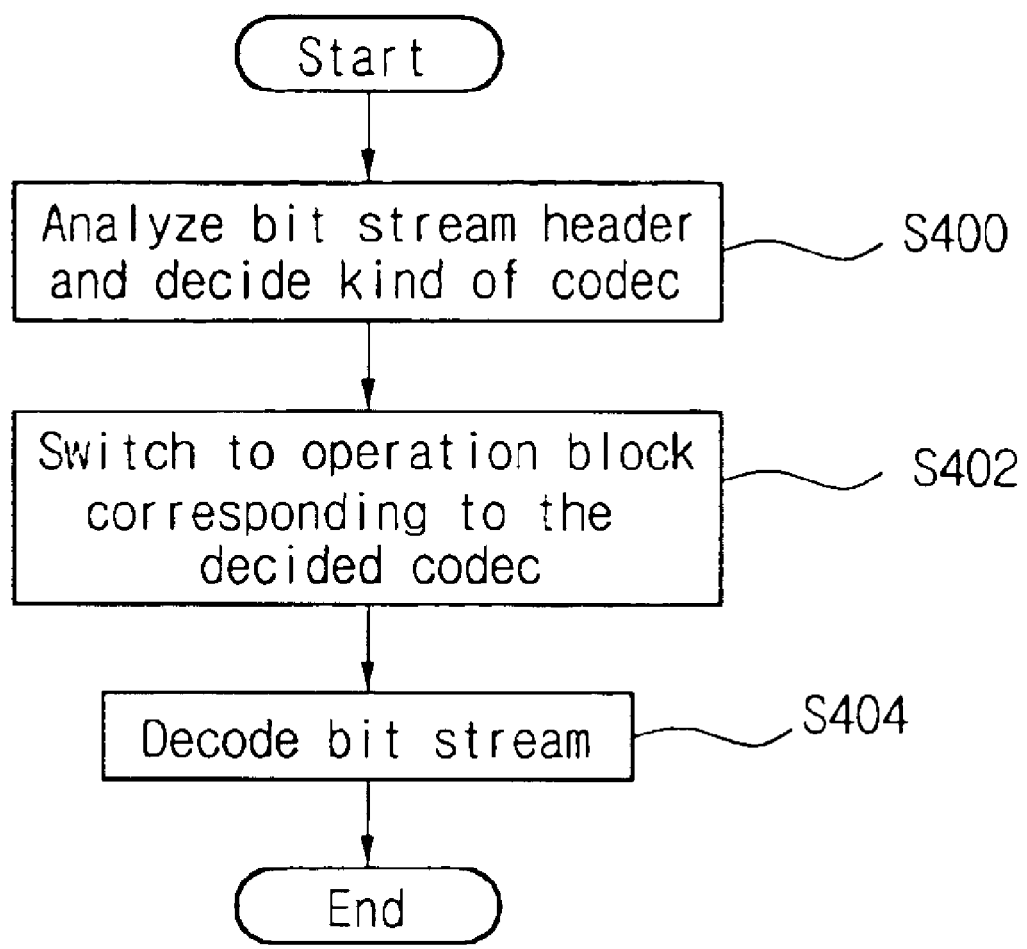
FIG. 4 is a flow chart describing a method for decoding a bit stream in accordance with one embodiment of the present invention.

FIG. 4 is a flow chart describing a method for decoding a bit stream in accordance with a preferred embodiment of the present invention.

Referring to FIG. 4, the video decoder analyzes the header of an input bit stream, and decides kind of codec to be applied (S400). Namely, the video decoder analyzes the header of the input bit stream to select an appropriate compression method.

Then the video decoder connects the switch to a decoder with the decided codec or to an operation block (S402), and decodes the bit stream (S404).

Figure 5:
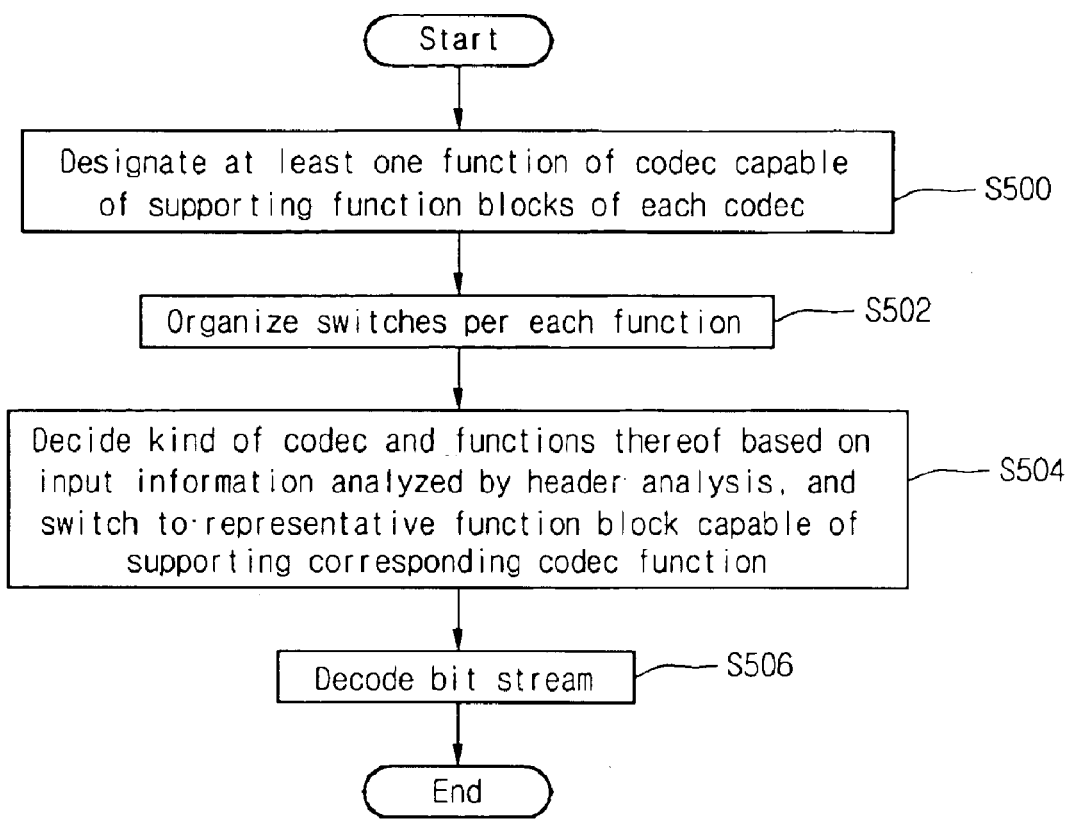
FIG. 5 is a flow chart describing a method for decoding a bit stream in accordance with another embodiment of the present invention.

FIG. 5 is a flow chart describing a method for decoding a bit stream in accordance with another embodiment of the present invention.

At least one of predetermined functions that can support an operation block (refer to 320, 330, 340, and 350 in FIG. 3), which is a function block, is designated in accordance with kind of codec (H263, H26L, MPEG and so on) (S500).

In other words, a user refers to a data book or a codec SPEC and finds out which codec supports which codec.

A switching means is organized for each function, that is, the number of the switching means is not greater than the number of functions supported by each codec (S502).

The header analysis unit analyzes input information and finds out each of the codecs and functions thereof, and connects the switch to a corresponding function in a given function block that can support the decided codec and function thereof (S504).

The input information is decoded (S506).

To elaborate and understand the decoding method described in FIG. 5, it will be useful to know each of codecs H, 263, H.26L, MPEG-1, MPEG-2, and MPEG-4 has the VLD, the IQ, the IDCT, and the MC.

Although not standard, there are other kinds of image decoders, including DivX, RealVideo, WindowsMediaVideo, etc. Each of these image decoders also has the VLD, the IQ, the IDCT, and the MC.

However, suppose that an MPEG-4 VLD function, for example, covers a H.263 VLD, an MPEG-1 VLD, and an MPEG-2 VLD. In such case, it will be unnecessary to use another VLD in a different codec, as long as there is an MPEG-4 compatible VLC.

Similarly, an MPEG-4 IQ can support an MPEG-2 IQ and a H.263 IQ. Needless to say, an MPEG-4 compatible IQ can cover the other two.

To make a conclusion, according to the embodiment illustrated in FIG. 2, total 8 function blocks, two for each of the VLD, the IQ, the IDCT, and the MC, to manufacture a decoder that can support both the MPEG-4 and H.263 codecs (or standards) at the same time. In the meantime, according to the embodiment illustrated in FIG. 3, since the MPEG-4 codec covers the H.263 codec, only 4 function blocks, one for each of the VLD, the IQ, the IDCT, and the MC, are needed to manufacture the same type of decoder.

Therefore, the embodiment of FIG. 3 is suggesting that since most of image decoders have the same configuration and function blocks thereof are basically same, the image decoders can be decomposed to function blocks and put together again.

In conclusion, according to the apparatus (i.e. the video decoder) and method for supporting plural video codecs of the present invention, by pre-analyzing kind of codec used in the input bit stream, it is possible to decode bit streams of every kind of codec that can be supported by one single decoder, without loading the decoder.

Also, according to the present invention, compatible or sharable functions can be shared to perform the decoding.

One embodiment of the present invention introduced an idea of integrating and switching various types of decoders to improve convenience of usage, and another embodiment of the present invention suggested that duplicated functions can be shared to reduce code size and hardware area.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for supporting plural codecs, comprising:
   a header analysis unit for analyzing input information of a transmitted bit stream and deciding a kind of codec being used;
   a switching unit, connected to the header analysis unit, configured to connect the header analysis unit to a corresponding decoder out of a plurality of decoders or to a corresponding operation block out of a plurality of operation blocks including at least one function on the basis of the input information; and
   a decoding unit for decoding the bit stream by means of a switched decoder or an operation block;
   wherein an output of the apparatus results from an output of a single decoder or a single operation block;
   wherein the switching unit is connected to the corresponding decoder or at least one of the plurality of operation blocks;
   wherein the switching unit is configured to connect the corresponding decoder to each of the at least one of the plurality of operation blocks, in response to a switch connection command;
   wherein a number of switches to be connected to each of the operation blocks is equal to a number of the plurality of operation blocks; and
   wherein a number of functions in the plurality of operation blocks connected to the switching unit is equal to or less than a number of the plural codecs.

2. The apparatus according to claim 1, wherein the header analysis unit analyzes header of a transmitted compressed bit stream, decides the kind of codec, and generates the switch connection command corresponding to the decided codec.

3. The apparatus according to claim 1, wherein the decoding unit comprises each of the plurality of operation blocks operated in respective codec existing in one board.

4. The apparatus according to claim 3, wherein the decoding unit comprises each of the plurality of operation blocks corresponding to each codec existing independently in one board.

5. The apparatus according to claim 1, wherein the at least one function of the plurality of operation blocks connected to the switching unit is integrated in accordance with the kind of codec.

6. A method for supporting plural codecs, comprising the steps of:

analyzing a header of a transmitted compressed bit stream and deciding a kind of codec;

in confirmation to the decoded codec, connecting at least one switch to at least one decoding unit including a plurality of decoders or to an operation block out of a plurality of operation blocks having at least one function, and decoding the bit stream; and producing an output resulting from an output of a single decoder or a single operation block;

wherein a number of switches connected to the at least one decoding unit is equal to a number of decoding units; and wherein a number of functions of the operation block connected to the at least one switch is not greater than a number of input codecs.

7. A method for supporting plural codecs, comprising the steps of:

designating at least one predetermined function capable of supporting an operation block (function block) in accordance with a kind of codec;

in a header analysis unit, analyzing input information and deciding the kind of codec and functions thereof;

switching to a corresponding function in the function block capable of supporting the decided codec and functions, using at least one switch;

decoding the information; and producing an output resulting from an output of a single function block;

wherein a number of switches connected to function blocks is equal to a of function blocks; and wherein a number of functions of the function block is not greater than a number of input codecs.

8. The method according to claim 7, further comprising the step of:

organizing the switches, such that the number of switches is not greater than a number of functions supported by each codec.

9. The method according to claim 7, wherein functions of the function block are integrated according to a supportable codec.

* * * * *